United States Patent
Young

(10) Patent No.: US 8,314,734 B2
(45) Date of Patent: *Nov. 20, 2012

(54) RECEIVER FOR RADIO POSITIONING SIGNALS

(75) Inventor: Philip John Young, Northampton (GB)

(73) Assignee: QUALCOMM Incorporated, San Diego, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 12/817,983

(22) Filed: Jun. 17, 2010

(65) Prior Publication Data

US 2010/0253576 A1 Oct. 7, 2010

Related U.S. Application Data

(63) Continuation of application No. 12/331,855, filed on Dec. 10, 2008, now Pat. No. 7,750,846, which is a continuation of application No. PCT/EP2006/063346, filed on Jun. 20, 2006.

(30) Foreign Application Priority Data

Jun. 20, 2006 (EP) .................................. 06763793

(51) Int. Cl.
*G01S 19/09* (2010.01)
*G01S 19/24* (2010.01)
(52) U.S. Cl. .............. 342/357.46; 342/357.63
(58) Field of Classification Search ............ 342/357.46, 342/357.63, 357.77
See application file for complete search history.

(56) References Cited

U.S. PATENT DOCUMENTS

| 6,018,784 A | 1/2000 | Gildea et al. |
| 7,750,846 B2 * | 7/2010 | Young ...................... 342/357.46 |
| 2005/0125369 A1 * | 6/2005 | Buck et al. ...................... 706/12 |

OTHER PUBLICATIONS

J.D. Owens et al., A Survey of General-Purpose Computation on Graphics Hardware, Eurographics 2005, State of the Art Reports, p. 21-51, Aug. 2005.*
Akos, et al., "Real-Time GPS Software Radio Receiver", ION NTM 2001, Long Beach, CA, Jan. 22, 2001, pp. 809-816; figure 2, XP002424053.
Damazio, Denis O. and Takai, Helio, The Cosmic Ray Radio Detector Data Acquisition System, Nuclear Science Symposium Conference Record, 2004 IEEE Rome, Italy, Oct. 16-22, 2004, Piscataway, NJ, USA, IEEE, Oct. 16, 2004, pp. 1205-1211, XP010818924, figure 1.
International Search Report and Written Opinion—PCT/EP2006/063346, International Searching Authority—European Patent Office, Mar. 23, 2007.
European Search Report—EP10008675 Search Authority—The Hague Patent Office, Nov. 24, 2010.

* cited by examiner

*Primary Examiner* — Jack W Keith
*Assistant Examiner* — Fred H Mull
(74) *Attorney, Agent, or Firm* — Shyam K. Parekh; Howard H. Seo

(57) ABSTRACT

A GPS, GLONASS or Galileo receiver for radio positioning signals wherein at least a part of the computing of position related data based on radio signals received from a plurality of space vehicles is carried out by a graphics or sound processor. The receiver thus makes use of available computing resources, thus achieving a lower bill of material.

25 Claims, 3 Drawing Sheets

RECEIVER FOR RADIO POSITIONING SIGNALS

RELATED APPLICATIONS

This application is a continuation under 35 U.S.C. §120 of prior application Ser. No. 12/331,855, filed Dec. 10, 2008 (titled "RECEIVER FOR RADIO POSITIONING SIGNALS"), which claimed the benefit of and priority to international patent application PCT/EP2006/063346, filed Jun. 20, 2006, the contents of both applications are expressly incorporated herein by reference.

FIELD

The present invention relates to a receiver for radio positioning signals, in particular to a receiver for the acquisition and tracking of GNSS (Global Navigation Satellite System) satellite localization signals, such as, GPS (global positioning satellite), GLONASS or Galileo signals. The present invention also relates to software used in such a receiver.

BACKGROUND

FIG. 1 illustrates an example of a known software GPS receiver. The illustrated receiver comprises a radio frequency (RF) module (for example, a first chip, RF receiver, RF chip or RF front-end and referred to as an RF module 1) to do the RF down conversion (via a downconverter 6) and digitization (via an analog-to-digital converter 8), and a second module 2, which is usually built around a general purpose processor or a digital signal processor (DSP) 9 and memory 10. The DSP 9 runs a program for performing the correlation and tracking procedure as well as navigation. The RF module 1 and the DSP 9 are mutually connected over a proprietary data bus 3. Solutions including both modules in a single chip have also been suggested. In some case as described below, an acquisition and navigation processor (main processor 11) computes and displays position related data.

In a GNSS system, the sources are orbiting GNSS Space Vehicles (SVs). In the case of the GPS, which is readily extendable to other radio localization systems, each space vehicle transmits two microwave carrier signals. The signal L1 at 1575.42 MHz carries the navigation message. The signal L2 at 1227.60 MHz is used among others to measure the ionospheric delay. The L1 and/or L2 signals are modulated with three binary codes:

The C/A Code (Coarse Acquisition) modulates the phase of the L1 carrier signal. The C/A code is a Pseudo Random Noise signal (PRN signal) at 1 MHz that repeats every 1023 bits (1 millisecond). Each SV uses a different C/A code. This noise-like code spreads the spectrum of the modulated signal over a 1 MHz bandwidth to improve immunity against noise.

The navigation message also modulates the L1-C/A code signal. It is a 50-Hz signal consisting of data bits that describe the GPS satellite orbits, clock corrections and other system parameters.

The P-Code (precise) modulates both the L1 and the L2 signals, and is for use by only authorized users with cryptographic keys.

The task of a GPS receiver is to retrieve the signals received from the various space vehicles that can be seen at a given instant. For that task, the circuit of FIG. 1 comprises an external GPS antenna 4 whose output signal is amplified in the RF module 1 by a low-noise amplifier 5 and down-converted to an intermediate frequency signal (IF signal) in the downconverter 6 (for example, a conversion unit), before being fed to the carrier removal stage 7. The IF signal often comprises one in-phase (I) and one quadrature (Q) component, which are converted by analog-to-digital converter 8 into I/Q digital signals delivered over a proprietary data bus 3 to the second module 2 for further processing.

The function of the second module 2 (which acts as a correlator and de-spreader) is to de-spread the I/Q signals delivered by the RF module 1 originating from the various SVs. To correlate, the second module 2 temporally aligns the incoming signals with locally generated copies of the PRN signals of each existing or likely SV. This correlation may occur in the time domain using time-domain correlation techniques using parallel multiplication and summations. In order to reduce the computation overhead and the acquisition time, alignment is often performed in the frequency domain, by correlating a Fast Fourier Transform (FFT) transform of the incoming I/Q signals with FFT transforms of the PRN signals characterizing each SV. There are various algorithms used by different manufacturers for carrying out this correlation in the time or frequency domain. It is however due to the fact that the correlation and de-spreading processes tend to require a lot of processing power. For example, a correlation in the frequency domain requires a lot of processing power for the computation of FFTs, multiplication by the complex conjugates of the CA Codes, and inverse FFT on the results that are needed for a fast time-to-frequency conversion.

In addition to the processing requirements, this process also requires a large amount of storage for data and results.

The second module 2 outputs digital processed data that are fed over the proprietary data bus 3 to an acquisition and navigation processor (main processor 11) for computing and for displaying position related data, including for example the position of the receiver. The nature of the data output by the second module depends on the receiver; some modules already deliver the location coordinates while others only deliver intermediary values such as pseudo ranges of the orbiting SVs.

In the prior art, the second module 2 is often built around a general purpose or DSP 9 accessing its own data and instruction memory 10. Examples of known correlators include the NJ1030 and NJ2020 baseband processors produced by NemeriX.

It is also known to use an FPGA or a dedicated ASIC as a correlator for computing the FFTs and for the various other computations performed by the second module 2.

Processors, ASICs and FPGA, however, are expensive, power and space consuming, therefore, the hardware resources required in the second module 2 for the correlation and tracking procedures have a significant impact on the price, volume and power-consumption of the overall receiver. Additionally these resources are often dedicated to the GPS algorithm and cannot be used for other purposes even when they are no longer required by the GPS function.

It has also been suggested to use a general purpose CPU in the system for the computation of the FFT required for the correlation. Although general purpose CPUs are fast, the total system throughput is often not fast enough. Moreover, this solution makes an inefficient use of the available memory bandwidth and puts a high load on the CPU, thus, blocking it from other tasks.

It is therefore a goal of the present invention to provide the digital processing power required by a radio positioning signal receiver in a less expensive, less power-consuming and less space consuming way than in the prior art, and in a manner which efficiently shares the resources so that they can also be used for other system functions when not required by the navigation functions.

SUMMARY OF THE DISCLOSURE

According to the invention, presented is a receiver for radio positioning signals comprising digital signal processing parts as part of a graphics or sound card or module for the computing of position related data based on radio signals received from a plurality of space vehicles.

In the context of this application, the phrase "position related data" is not limited to the position itself, but also encompasses any data derived from the position, including the speed, acceleration, altitude, etc, as well as any intermediate data or values used for computation of the position from the radio positioning signals received by the receiver. The position related data may include FFT transforms of signals derived from the received signals. Alternatively, the position related data may include properties of signals derived from the received signals. The position related data may include code and Doppler shifts of candidate correlation peaks. The position related data may include a single FFT value, a set of correlation peaks or a full determination of the pseudo ranges or position.

The receiver for radio positioning signals comprises: a high frequency part for the acquisition and processing of analog radio signals from a plurality of satellites, said high frequency part delivering digital intermediary frequency (IF) signals; and digital signal processing parts for the de-spreading of said digital IF signals; wherein said digital processing parts comprises a processor as part of a graphics or sound card.

A graphics processing unit is usually significantly faster than a general purpose CPU, but a graphics processing unit is specialized for specific task, especially repetitive tasks requiring a large memory bandwidth. Much of the available processing power offered by graphics cards is used by only a few applications, like games and graphics software, and remains unused during other applications, like office and geographic navigation programs. Therefore, according to the invention, the computing-requiring tasks of GPS computations are performed by the graphics or sound card that remains for the most part unused during many GPS-based applications.

Additionally, in 3D graphics and audio applications, these processors are usually attached to large dedicated memories with high bandwidth capabilities used typically for storing and processing textures and audio images. In all but the most demanding games applications, these are generally unused and can be re-targeted for use in GPS functions.

In most 3D graphics and audio applications, the associated processors are optimized for performing repetitive mathematical tasks on blocks of data and are ideally suited for efficiently performing the functions required for the GPS signal processing.

The receiver thus takes advantage of the available resources in the system more efficiently than the traditional approach.

Some embodiments provide for a mobile device for determining a position of the mobile device using graphics processing, the mobile device comprising: a radio frequency (RF) module to receive an RF signal comprising radio positioning signals; a graphics processing unit comprising a processor, memory and graphics software and coupled to the RF receiver to receive the radio positioning signals; and memory coupled to the processor of the graphics processing unit, wherein the memory comprises software to perform GNSS signal processing, at least in part, in the graphics processing unit; and software to determine the position of the mobile device.

Some embodiments provide for a method for determining a position of a mobile device using a graphics processor, the method comprising: receiving, at a radio frequency (RF) module, an RF signal comprising radio positioning signal; producing orthogonal I/Q signals based on the RF signal; computing, in the graphics processor, a plurality of correlations from the orthogonal I/Q signals to form correlation results; and computing position related data based on the correlation results.

Some embodiments provide for a mobile device for determining a position of the mobile device using a graphics processor, the mobile device comprising: means for receiving an RF signal comprising radio positioning signal; means for producing orthogonal I/Q signals based on the RF signal; means for computing, in the graphics processor, a plurality of correlations from the orthogonal I/Q signals to form correlation results; and means for computing position related data based on the correlation results.

Some embodiments provide for a mobile device comprising a processor and memory wherein the memory includes software instructions to: receive, in a radio frequency (RF) module, an RF signal comprising radio positioning signal; produce orthogonal I/Q signals based on the RF signal; compute, in the graphics processor, a plurality of correlations from the orthogonal I/Q signals to form correlation results; and compute position related data based on the correlation results.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

The invention will be better understood with the aid of the description of an embodiment given by way of example and illustrated by the figures.

DETAILED DESCRIPTION

Figure 1:
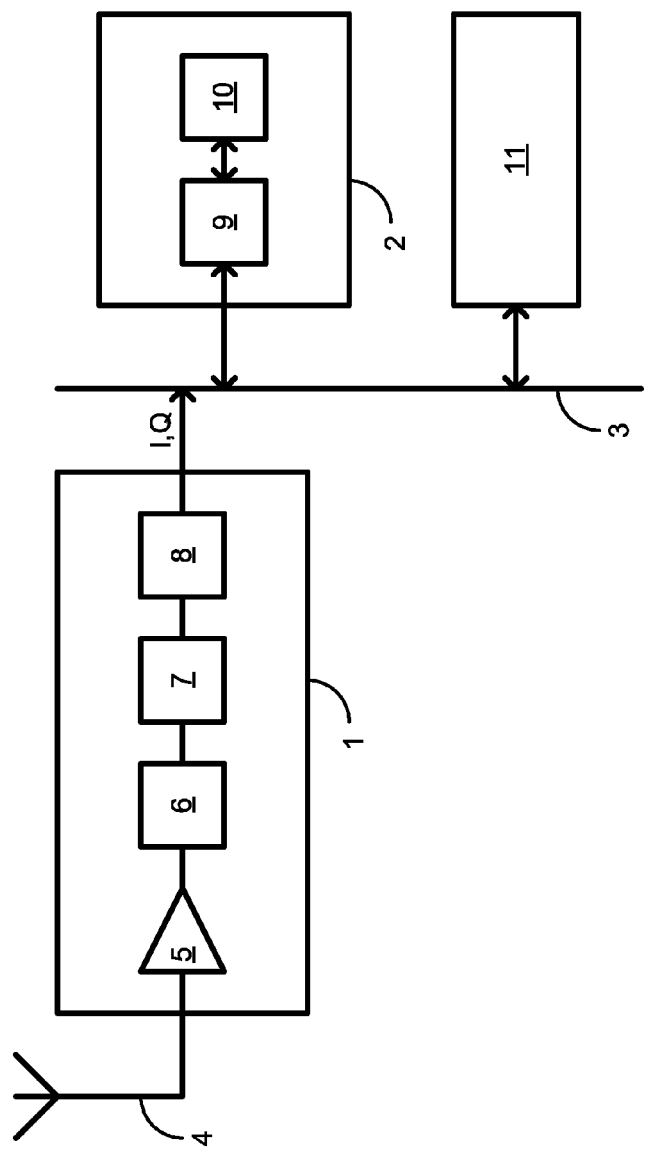
FIG. 1 is a block diagram illustrating a known GPS receiver.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

As used herein, mobile device refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term mobile device is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, mobile device is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. These transmitters may be replaced by terrestrial transmitters called pseudolite transmitters. Such satellite and pseudolite transmitters typically transmit a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Figure 2:
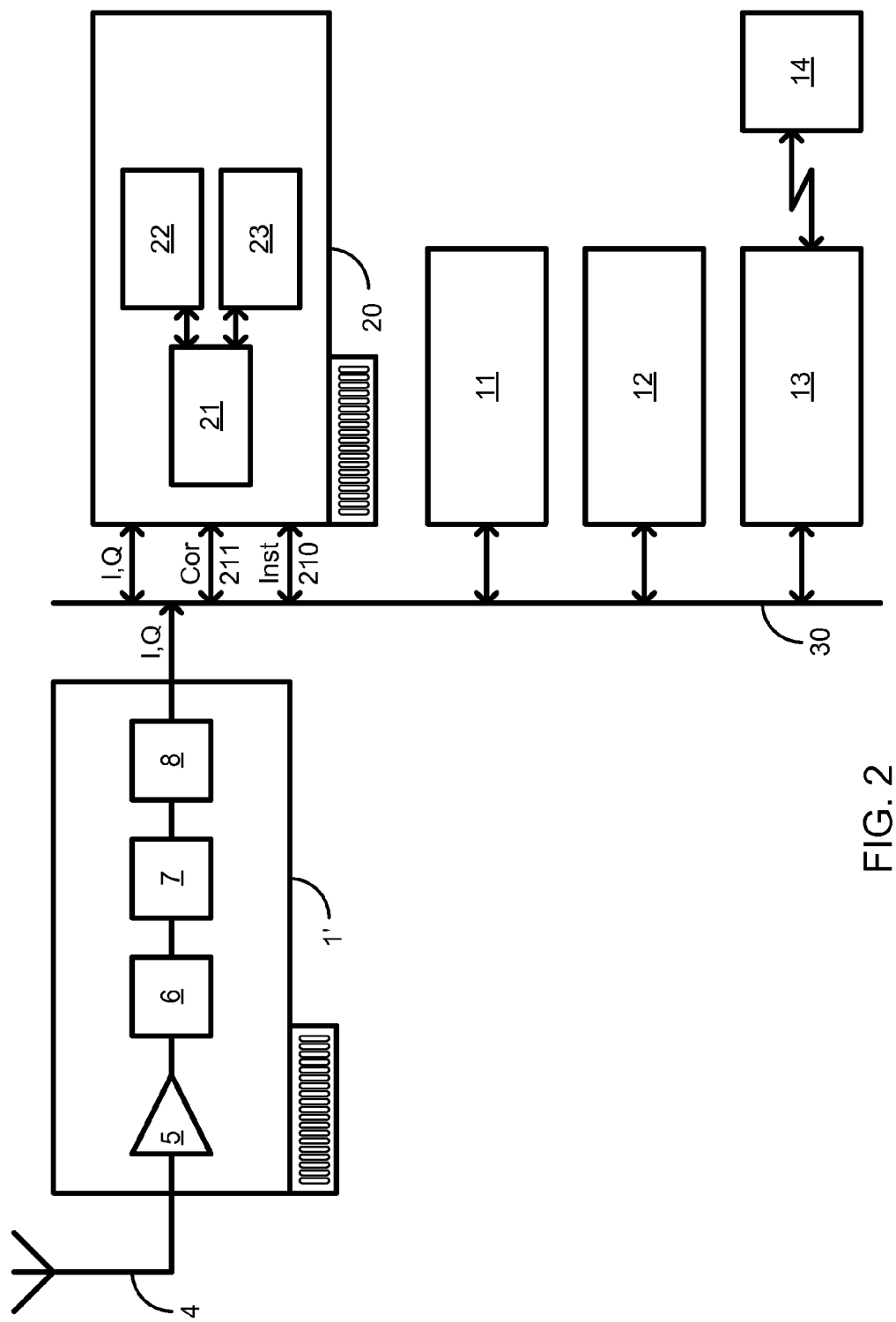
FIG. 2 is a block diagram illustrating a first embodiment of receiver according to the invention.

FIG. 2 illustrates an embodiment of a receiver for radio positioning signals according to the invention. This receiver may be used for receiving and processing signals from GPS, Galileo or GLONASS satellites, or from a terrestrial positioning system. It is built around a general-purpose computer, such as a personal computer, a laptop, a palmtop, a portable media player, Microsoft's Origami or tablet computer, a smart phone, etc. The receiver therefore generally comprises one or more general purpose processors (for example, a general computing system, general purpose computer or main processor 11), for example a Pentium, ARM, or ARC processor, for running an operating system and software applications, including navigation software and other office utility, communication and game applications. Other components, including a general purpose RAM, input and output peripherals such as display, loudspeaker, keyboard, pointing device, drives, etc, are globally referred with reference number 12 and connected to the processor over a general-purpose bus, such as a PCI, AMBA, or preferably PCI-Express bus, or through other non illustrated components. The receiver also includes one or more communication interfaces 13 (WLAN, Bluetooth, cellular, Ethernet, etc) for communicating with external systems (for example, external devices 14), possibly including positioning assistance servers.

A graphics or sound unit (for example, a graphics and/or sound card, or a graphics card, referred to as a graphics/sound card 20) provides computing functions required for visual and/or audio restitution of data. The graphics/sound card 20 is built around at least one graphics processor 21 (for example, a digital signal processor, a dedicated graphics or sound processor, or a processing system), and accesses its own data memory 22 and instruction memory 23. Frequently the graphics/sound card 20 includes one or several groups of parallel processors, designed to perform several tasks of similar nature at the same time. The general architecture of the receiver may be conventional and does not need to be described with more details.

The receiver of the invention also comprises a high frequency part (for example, an RF part, RF chip or RF module 1), preferably mounted on a removable extension card 1' inserted in a slot of the receiver, for example a PCI-Express card. The RF module 1 acts as a means for receiving an RF signal comprising radio positioning signal. The RF module 1 may, for example, comprise analogue components and a super-heterodyne receiver front-end for receiving signals in the GPS L1 band. It includes a connector for an external GPS antenna 4. A signal from the antenna is fed to a low noise amplifier 5, for example, a single stage cascade device. The amplified signal is then fed to a downconverter 6, for example, a single-balanced mixer that converts the RF signal to the baseband or preferably to an IF signal. A filter 7 is provided at the output of the downconverter 6 to remove the carrier and to select the desired signal bandwidth. An analog-to-digital converter 8 converts the analog signal at the output of the filter 7 into two series of words, encoding into two orthogonal digital I/Q signals delivered over a data bus 30 to the graphics/sound card 20, as shown in FIG. 2, for further processing. Therefore, the RF module 1 also acts as a means for producing orthogonal I/Q signals based on the RF signal.

In an embodiment, the RF module 1 may be built around a conventional NJ1006A from NemeriX or compatible chip.

According to a variant of the invention not represented in the figures, the RF module 1 does not directly provide digital demodulated I/Q signals, but rather a signal in which the I/Q signals are modulated over a low intermediate frequency (IF) carrier to form a low IF signal. In the subsequent stages of the receiver, the low IF signal is converted into I and Q baseband signals by known means.

According to the invention, at least one part of the instruction memory 23 of the graphics/sound card 20 has been programmed so as to include functions for computing position related data, or intermediate values for the determination of the position, based on data delivered by the RF module 1. In an embodiment, the instruction memory 23 of the graphics/sound card 20 is a permanent or semi-permanent memory, such as an EEPROM, which has been programmed during manufacture or personalization to include software code for computation of the functions and methods requested by the location signals receiver. In another embodiment, the graphics processor 21 of the graphics/sound card 20 is able to run software code stored in the instruction memory 23 or in one of the other components 12 (including general purpose RAM) and can be dynamically updated at any time. In both situations, the graphics processor 21 of the graphics/sound card 20 responds to instructions 210 received over the data bus 30 for deciding on the portion of software code to execute at each moment.

Computation of the position related data by the graphics/sound card 20 is preferably done in parallel in the graphics/sound card 20. The graphics/sound card 20 may include parallel processors and/or may allow for parallel operations and may include operators that function in parallel. For example, a parallel operation may include a vector summation of two input vectors that results in an output vector. In this example, the first element of the first input vector is summed with the first element of the second input vector and the resulting sum is placed into the first element of the output vector. Similarly, the second respective elements are summed and placed in the second element of the output vector, and so on for each pair of elements.

In this way, the computation of the position related data may advantageously use parallel operations inherent in the processor of the graphics/sound card 20. This computation of the position related data may occur during a period of acquisition. Alternatively, or in addition to, this computation of the position related data may occur during a tracking process. During this time, processing of actual graphical data (such as a sequence of 3D renderings) or sound data would normally use functions executed on the graphics/sound card 20. In some embodiments, the processing of graphics/sound data is slowed down graphics as the processing resources on the graphics/sound card 20 are being diverted to the computation of the position related data. In another embodiments, the processor on the graphics/sound card 20 is entirely devoted to the computation of the position related data. In these cases, the processing of graphical or sound data may be temporarily prevented or halted rather than reduced until completion of the position related data computation and the use of some extended graphics or sound functionality on graphics and/or sound data may be momentarily prevented. As a result, the graphics and/or sound data may not be timely processed and the display may not be updated with new graphics information. In some cases, even the display, or at least one part of the display, may be temporarily frozen or not updated with new graphics during the acquisition and/or tracking process. In sum, as a result of computing the plurality of correlations, the graphics/sound card 20 may be inhibited or prevented from graphics processing of actual graphics or sound data.

The functions performed by the graphics processor 21 on the graphics/sound card 20 may include some or all of the functions performed by the second module 2 in the prior art embodiment of FIG. 1. More specifically, the graphics processor 21 can run any function needed for the acquisition and/or tracking of signals from the various space vehicles, including correlation functions for temporal alignment, in the time or frequency domain, of the signals delivered by the RF module 1 with locally generated copies of the PRN signals of each existing or likely space vehicle. The graphics/sound card 20 may thus include and execute routines for generating those copies of the PRNs signals and/or routines for performing the correlation of signals.

According to a preferred embodiment of the invention, the correlation of the signals delivered by the RF module 1 is carried out by a correlation engine in the frequency domain, implemented by appropriate software elements executed by the graphics processor 21 of the graphics/sound card 20 and, preferably, stored in instruction memory 23 of the graphics/sound card 20. In this case, the graphics processor 21 of the graphics/sound card 20 is programmed, for example, with routines for computing Fourier transforms (FTs), for example FFTs and inverse FFTs, etc.

Since the correlation operation is equivalent to a simple multiplication in the frequency domain, the graphics processor 21 preferably will be programmed to compute, or retrieve from a pre-calculated table, the Fourier counterparts of the PRN signals of each existing or expected space vehicle, and to evaluate the corresponding correlation function with the incoming RF signal from the RF module 1. The person skilled in the art will appreciate that this frequency domain approach is especially appropriate when the received signals are weak and, consequently, the search space is very large.

The large computational bandwidth of the graphics processor 21 allows, in this case, to acquire and track weak GPS signals with high-sensitivity, without placing a large burden on the main processor 11.

Preferably, the correlation data 211 computed in the graphics/sound card 20 is used to obtain the relative time shifts of pseudo-random noise codes in the signals delivered by the RF module 1 and received from the different satellites in sight. Such a relative time shift is indicated, for example, by the position of the correlation peak for the corresponding satellite in a histogram accumulated in the graphics/sound card 20.

Preferably, the correlation results or correlation data 211 computed in the graphics/sound card 20 are transferred, by means of the data bus 30, to a navigation module implemented by appropriate software modules, executed by the main processor 11. Once a sufficient number satellite signals are detected and tracked, a correlation module uses the determined relative shifts, indicated, for example, by the position of the corresponding correlation peak or peaks, to determine the position of the receiver, as it is known in the art. The invention includes, however, also variants in which parts or all of the functions of the navigation module are delegated to the graphics processor 21 of the graphics/sound card 20. In sum, the graphics processor 21 acts as a means for computing a plurality of correlations from the orthogonal I/Q signals to form correlation results.

In the case of an assisted-GPS system, the functions executed by the graphics/sound card 20 may also use assistance information retrieved from external devices 14 (such as assistance servers) by the main processor 11 and transmitted to the graphics/sound card 20 over the data bus 30. The main processor 11 acts as a means for computing position related data based on the correlation results.

In a preferred embodiment, the functions of the graphics/sound card 20 are piloting a suitable program run by the main processor 11 of the system. The main processor 11 also runs the operating system and application software, including navigation software for computing the position and other data based on digital data computed and output by the graphics/sound card 20. As already mentioned, the system may also comprise one or more communication interfaces 13 for accessing external devices 14 and retrieving assistance data to help the receiver for a fast acquisition of position, even in difficult condition such as indoors or in urban canyons, as well as maps or traffic information for example.

In the embodiment of FIG. 2, all computations in the baseband are performed by the graphics/sound card 20 and by the main processor 11. The only additional components that are added to a GPS-less system are an external gps antenna 4, the RF module 1 and possibly instruction memory 23 on the graphics/sound card 20 with an additional set of instructions. The cost and complexity of the system are thus very low, but the computing load on the graphics/sound card 20 and on the main processor 11 is high.

Figure 3:
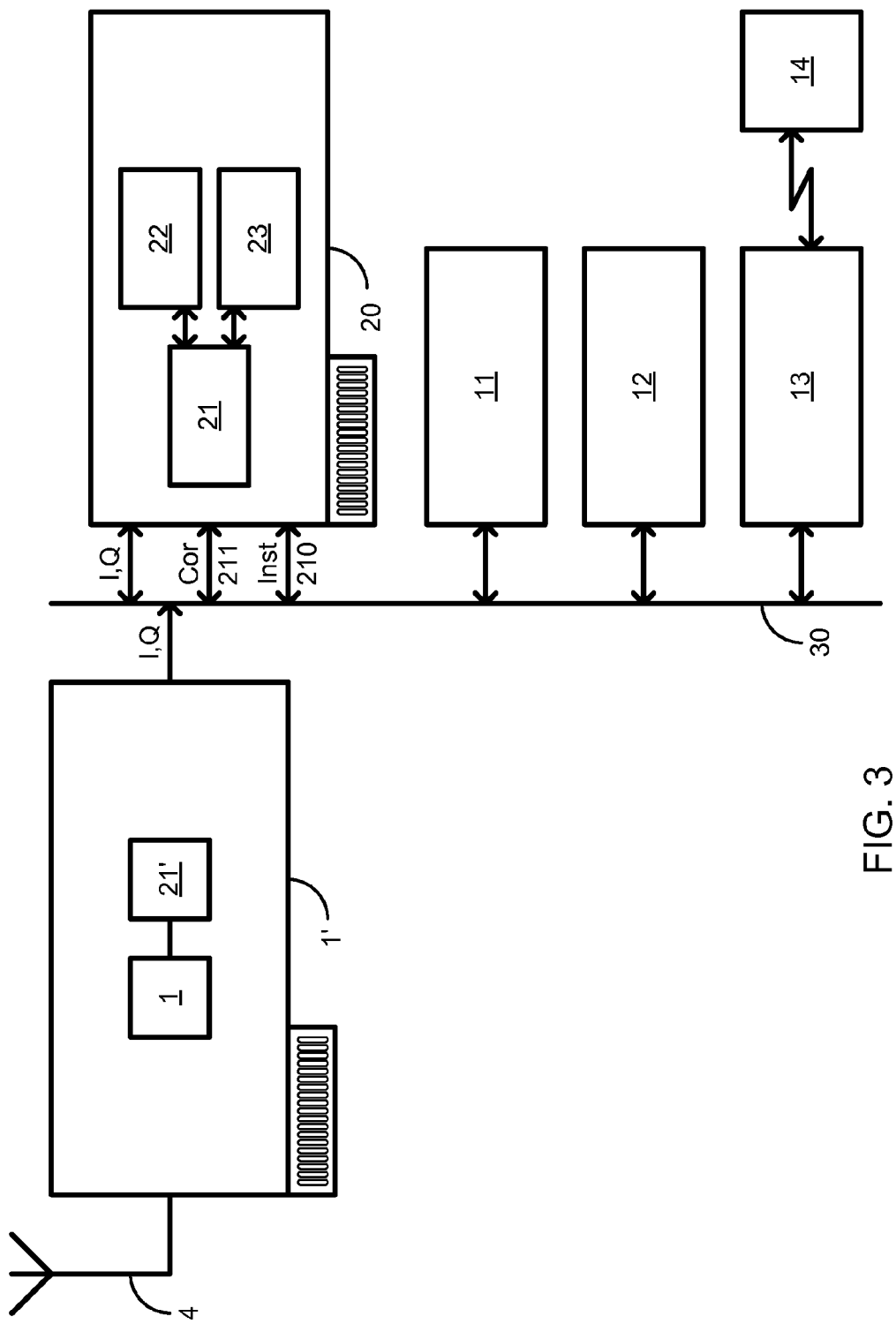
FIG. 3 is a block diagram illustrating a second embodiment of receiver according to the invention.

FIG. 3 illustrates another embodiment of the invention in which an RF module 1 and an additional processor 21' are provided, preferably on the removable extension card 1', for performing a part of the computing operations in the baseband and/or IF band. The additional processor 21' may be built as an independent chip or set of chips, or as a digital module in the RF module 1. The additional processor 21' carries out a part of the operations described above as performed by the graphics/sound card 20 and/or by the main processor 11 in the embodiment of FIG. 2. Thus, the additional processor 21' reduces the load and requirements for the graphics/sound card 20 and/or the main processor 11. Sharing of the computing operations among the additional processor 21' of the RF module 1, the graphics processor 21 on the graphics/sound card 20 and the main processor 11 depends on the implementation. In a preferred embodiment, the additional processor 21' will perform all tracking and acquisition computations, whereas repetitive tasks, such as computation of FFTs, are delegated to the graphics/sound card 20. The main processor 11 is then responsible to carry out the user's front-end application, including the user interface and the display of results. The additional processor 21' of the RF module 1 may also directly command the graphics processor 21 of the graphics/sound card 20 and make it perform computations needed by the tracking or acquisition algorithms.

It is also possible to duplicate functions and to provide the same functionalities on the graphics processor 21 of the graphics/sound card 20 and in the additional processor 21' and/or in the main processor 11. The choice of one or the other module to perform one operation at a specific moment depends then for example on the current load and availability of each component, on the required speed and/or on the power consumption. For example, the system may decide to compute FFTs with the graphics/sound card 20 at a particular moment in order to put the additional processor 21' or some parts of this additional processor 21' in a stand-by mode and reduce the power consumption, and to use the additional processor 21' and/or the main processor 11 at a different moment when a fast acquisition is required.

Since during acquisition the time and frequency uncertainties are greater, the computation in the frequency domain is an efficient approach to improve acquisition sensitivity and speed, however once SVs are acquired processing in the time domain can be more energy efficient. Another embodiment of the system uses the graphics/sound card 20 to accelerate acquisition and/or re-acquisition and then transfers the necessary information to a dedicated correlation engine operating in the time domain for efficient and low power tracking, thus relieving the burden on the graphics/sound card 20 after the initial few seconds required for the acquisition.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A mobile device for determining a position of the mobile device using graphics processing, the mobile device comprising:
   a radio frequency (RF) module to receive an RF signal comprising radio positioning signals;
   a graphics processing unit comprising a processor, memory and graphics software and coupled to the RF receiver to receive the radio positioning signals; and
   memory coupled to the processor of the graphics processing unit, wherein the memory comprises
      software to perform GNSS signal processing, at least in part, in the graphics processing unit; and
      software to determine the position of the mobile device.

2. The mobile device of claim 1, wherein the radio positioning signals comprise signals from a plurality of space vehicles.

3. The mobile device of claim 1, wherein the radio positioning signals comprise signals from a terrestrial positioning system.

4. The mobile device of claim 1, wherein the mobile device comprises a smart phone.

5. The mobile device of claim 1, further comprising a main processor separate from and coupled to the graphics processing unit.

6. The mobile device of claim 1, wherein the processor in the graphics processing unit comprises a plurality of parallel processors.

7. A method for determining a position of a mobile device using a graphics processor, the method comprising:
   receiving, at a radio frequency (RF) module, an RF signal comprising radio positioning signals;
   producing orthogonal I/Q signals based on the RF signal;
   computing, in the graphics processor, a plurality of correlations from the orthogonal I/Q signals to form correlation results; and
   computing position related data based on the correlation results.

8. The method of claim 7, wherein producing the orthogonal I/Q signals comprises producing the orthogonal I/Q signals in the RF module.

9. The method of claim 7, wherein producing the orthogonal I/Q signals comprises producing the orthogonal I/Q signals in the graphics processor.

10. The method of claim 7, wherein computing the plurality of correlations comprises correlating the orthogonal I/Q signals with a local copy of a plurality of Pseudo Random Noise (PRN) signals of a corresponding plurality of space vehicles (SVs).

11. The method of claim 7, further comprising displaying the position related data.

12. The method of claim 7, wherein computing the position related data comprises computing the position related data in the graphics processor.

13. The method of claim 7, wherein producing the orthogonal I/Q signals comprises:
   producing an intermediate frequency (IF) signal based on the RF signals; and
   producing the orthogonal I/Q signals based on the IF signal.

14. The method of claim 7, further comprising reducing graphics processing of graphics data as a result of computing the plurality of correlations.

15. The method of claim 7, further comprising preventing graphics processing of graphics data as a result of computing the plurality of correlations.

16. The method of claim 7, further comprising executing a navigation module in the graphics processor.

17. The method of claim 7, further comprising determining a correlation peak in a histogram indicating a relative time shift of a satellite.

18. The method of claim 7, further comprising generating, in the graphics module, a local copy of a Pseudo Random Noise (PRN) signal for each of a plurality of space vehicles (SVs).

19. The method of claim 7, further comprising computing a Fast Fourier Transform (FFT) on the graphics processor.

20. The method of claim 7, further comprising retrieving, by a main processor, assistance information from an external assistance server.

21. The method of claim 7, further comprising piloting the graphics processor by a main processor.

22. The method of claim 7, further comprising executing navigation software to compute the position based on digital data from the graphics processor.

23. A mobile device for determining a position of the mobile device using graphics processing, the mobile device comprising:
   means for producing orthogonal I/Q signals based on an RF signal that comprises radio positioning signals;
   means for using graphics processing resources to compute a plurality of correlations from the orthogonal I/Q signals to form correlation results; and
   means for computing position related data based on the correlation results.

24. A mobile device comprising a processor and memory wherein the memory includes software instructions to:
   receive, in a radio frequency (RF) module, an RF signal comprising radio positioning signals;
   produce orthogonal I/Q signals based on the RF signal;
   compute, in the graphics processor, a plurality of correlations from the orthogonal I/Q signals to form correlation results; and
   compute position related data based on the correlation results.

25. A computer-readable medium comprising program code stored thereon for a mobile device to determine a position of the mobile device using a graphics processor, the program code including program code to:
   receive, in a radio frequency (RF) module, an RF signal comprising radio positioning signals;
   produce orthogonal I/Q signals based on the RF signal;
   compute, in the graphics processor, a plurality of correlations from the orthogonal I/Q signals to form correlation results; and
   compute position related data based on the correlation results.

* * * * *